United States Patent
Kuo et al.

(10) Patent No.: US 8,391,198 B2
(45) Date of Patent: Mar. 5, 2013

(54) RELIABLE SYNCHRONIZATION APPARATUS AND METHOD WITHIN A MULTICAST AND BROADCAST SERVICE ZONE

(75) Inventors: Wei-Han Kuo, Hsinchu (TW); Chia-Lung Liu, Taoyuan (TW); Jui-Tang Wang, Keelung (TW); Jen-Shun Yang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 435 days.

(21) Appl. No.: 12/717,958

(22) Filed: Mar. 5, 2010

(65) Prior Publication Data

US 2011/0116434 A1    May 19, 2011

(30) Foreign Application Priority Data

Nov. 13, 2009   (TW) .............................. 98138734 A

(51) Int. Cl.
  G06F 15/16 (2006.01)
  H04H 20/71 (2008.01)
  H04J 3/06 (2006.01)
  H04J 3/07 (2006.01)

(52) U.S. Cl. ........ 370/312; 709/248; 370/503; 370/507; 370/509

(58) Field of Classification Search .................. 370/312, 370/503, 507, 509; 709/248
See application file for complete search history.

(56) References Cited

U.S. PATENT DOCUMENTS

| | | | |
|---|---|---|---|
| 6,269,080 B1 | 7/2001 | Kumar | |
| 6,507,562 B1 | 1/2003 | Kadansky et al. | |
| 6,718,361 B1 | 4/2004 | Basani et al. | |
| 2002/0018448 A1* | 2/2002 | Amis et al. | 370/255 |
| 2009/0285126 A1* | 11/2009 | Lu et al. | 370/255 |
| 2011/0211468 A1* | 9/2011 | Zhang et al. | 370/252 |
| 2011/0317612 A1* | 12/2011 | Kim et al. | 370/312 |

* cited by examiner

*Primary Examiner* — Ayaz Sheikh
*Assistant Examiner* — Tarell Hampton
(74) *Attorney, Agent, or Firm* — Lin & Associates IP, Inc.

(57) ABSTRACT

A reliable synchronization apparatus and method within a multicast and broadcast service (MBS) zone having m sync executers (SEs) belonging to n retransmission zones is provided. Each retransmission zone has a selected leader SE and other member SEs. The apparatus comprises a sync controller and the n selected leader SEs. When the Sync controller multicasts a sync ruler to all SEs in a retransmission zone, the leader SE that loses the Sync ruler sends a NACK message to request the sync controller to retransmit the sync ruler. An election is triggered for updating leader information and announcing election to all SEs. The member SE that loses the sync ruler sends a NACK message to request its leader or the Sync controller to retransmit the sync ruler.

26 Claims, 18 Drawing Sheets

RELIABLE SYNCHRONIZATION APPARATUS AND METHOD WITHIN A MULTICAST AND BROADCAST SERVICE ZONE

TECHNICAL FIELD

The disclosure generally relates to a reliable synchronization apparatus and method within a multicast and broadcast service (MBS) zone.

BACKGROUND

IEEE 802.16 standard and related international industrial association, such as, WiMAX (Worldwide Interoperability for Microwave Access), work hard to assure that high speed data transmission is available to a large number of users in a large coverage area. In wireless Internet technologies, multicast and broadcast service is provided through MBS zone. FIG. 1 shows an exemplary schematic view of a WiMAX MBS zone architecture. Under this architecture, in an access service network (ASN) environment, after receiving content data from connectivity service network (CSN) 111, a MBS controller 110 transfers the data content stored in a content sync controller server 110a to an anchor 103. Anchor 103 then distributes the content data to other linked sync controllers, such as, a synch controller 113, and a sync executer (SE), such as, SE 121-124. These SEs are distributed in a plurality of MBS zones, such as, MBS zones 101, 102.

Single-BS mode and multiple-BS mode are architectures that may realize MBS zones. In single-BS mode architecture, a mobile station always attaches to a node. In multiple-BS mode architecture, when a mobile station moves from a node to other nodes in the same MBS zone, no handover process is executed. This mobile station may receive the signals from a plurality of nodes in the MBS zone. Under multiple-BS mode architecture, all base stations (BSs) in the same MBS zone need to synchronize.

In the frame-level synchronization technique, when a subscribed service is distributed to a MBS transmission zone, all the MBS zones in the MBS transmission zone need frame-level synchronization. All MBS zones of this MBS transmission zone need to transmit the same content to the subscriber and a MBS controller is responsible for coordination so that all the MBS zones transmit the content in synchronization.

In the macro-diversity level synchronization technique, the physical parameters and the scheduling positions in waveform of all the mobile stations in the same MBS zone need to be identical. FIG. 2 shows an exemplary schematic view of the synchronization architecture. When receiving the content data from a CSN 210, a MBS distribution function unit 220 transfers the content data to a MBS sync controller 230. MBS sync controller 230 generates sync ruler and time information 232 according to the content data and transmits to MBS SE 240. SE 240 uses the information 232 to create the same waveform. Sync ruler is the guideline for creating waveform.

The locations of sync controller and SE depend on the situations. For example, sync controller and upper SE are in the access service network gateway (ASN-GW), while lower SE is in the mobile station. Or, sync controller is in ASN-GW, while SE is in the BS. Or, sync controller is an independent unit and SE is in the BS.

U.S. Pat. No. 6,718,361 disclosed a system for distributing information to a plurality of group members in a communication network. The information distribution system may use unicast to transmit sync message from sync controller to SE. As shown in FIG. 3, an information distribution system 300 includes a content control manager 301 and a group leader, such as, 303a-303c, 305a-305c. Content control manager 301 uses a tree-based structure to unicast sync message to all the connected leaders. The leaders are responsible to transfer the information to other leaders and corresponding clients. In the unicast transmission, sync message is directly transferred to SE instead of through network.

U.S. Pat. No. 6,269,080 discloses a method of using multicast to distribute data file and implement synchronization. As shown in the exemplary flowchart of FIG. 4, a file distribution and synchronization protocol (FDSP) server selects an active receiver from a group of FDSP clients (step 410). The FDSP server multicasts the data file to all the receivers and let the active receiver control the transmission rate (step 420). The active receiver uses unicast to request the FDSP server to retransmit lost data packets (step 430). The FDSP server retransmits lost data packets to respond to the active receiver (step 440). Once the active receiver obtains all the file data, the FDSP server determines whether other FDSP client still needs to obtain data file (step 450). If so, the FDSP server selects a new active receiver from the FDSP clients (step 460). Then, steps 430-460 are repeated until all the FDSP clients receive all the data files transmitted by the FDSP server.

U.S. Pat. No. 6,507,562 disclosed a method for finding an optimal repair tree in multicast communication. The optimal repair tree is formed by a sender station and a plurality of repair head stations. This method finds an optimal repair head station from a plurality of neighboring receivers. The plurality of neighboring receivers dynamically forms a repair group. The repair head station of each repair group is responsible for receiving the ACK and NACK message from the destination station of the repair group, and helps to retransmit the lost data multicast by sender station but not received to the destination station of the repair group.

SUMMARY

The disclosed exemplary embodiments may provide a reliable synchronization apparatus and method within a MBS zone.

In an exemplary embodiment, the disclosed relates to a reliable synchronization apparatus within a multicast and broadcast service zone. The m sync executers (SEs) of the MBS zone belong to n retransmission zones. Each retransmission zone has a selected leader SE. The un-selected SEs are the member SEs of the leader SE, m>n≧1. The apparatus comprises a sync controller and the n selected leader SEs. When the sync controller multicasts a sync ruler to all the SEs of a retransmission zone of the n retransmission zones, the leader SE not having received the sync ruler unicasts a NACK message to the sync controller to request retransmission of the sync ruler. The sync controller triggers an election to update the leader SE information and multicasts the information to all SEs. Each group member SE not having received the sync ruler unicasts a NACK message to the leader SE or the sync controller to request retransmission of the sync ruler.

In another exemplary embodiment, the disclosed relates to a reliable synchronization method within a multicast and broadcast service zone. The method comprises: pre-selecting a leader SE in each retransmission zone of n retransmission zones, and non-selected SEs being member SEs corresponding to the leader SE; through a sync controller, multicasting a sync ruler to all the SEs of a retransmission zone of the n retransmission zones; the leader SE not having received the sync ruler unicasting a NACK message to the sync controller to request the retransmission of the sync ruler, the sync controller retransmitting the sync ruler and triggering an election to update leader SE information and multicasting the information to all SEs; and each group member SE not having received the sync ruler unicasting a NACK message to the leader SE or the sync controller to request the retransmission of the sync ruler.

The foregoing and other features and aspects of the present invention will become better understood from a careful reading of a detailed description provided herein below with appropriate reference to the accompanying drawings.

DETAILED DESCRIPTION OF THE EXEMPLARY EMBODIMENTS

The disclosed exemplary embodiments may provide a reliable synchronization apparatus and method within a MBS zone. The exemplary embodiments are based on multicast transmission, which uses a sync rule recovery period, such as time of expected arrival (TOA) parameter, to point out the time of receiving sync ruler by sync executers (SEs) and assist sender station to activate an automatic repeat request (ARQ) procedure, and then use a retransmission technique to guarantee the transmission reliability.

Figure 1:
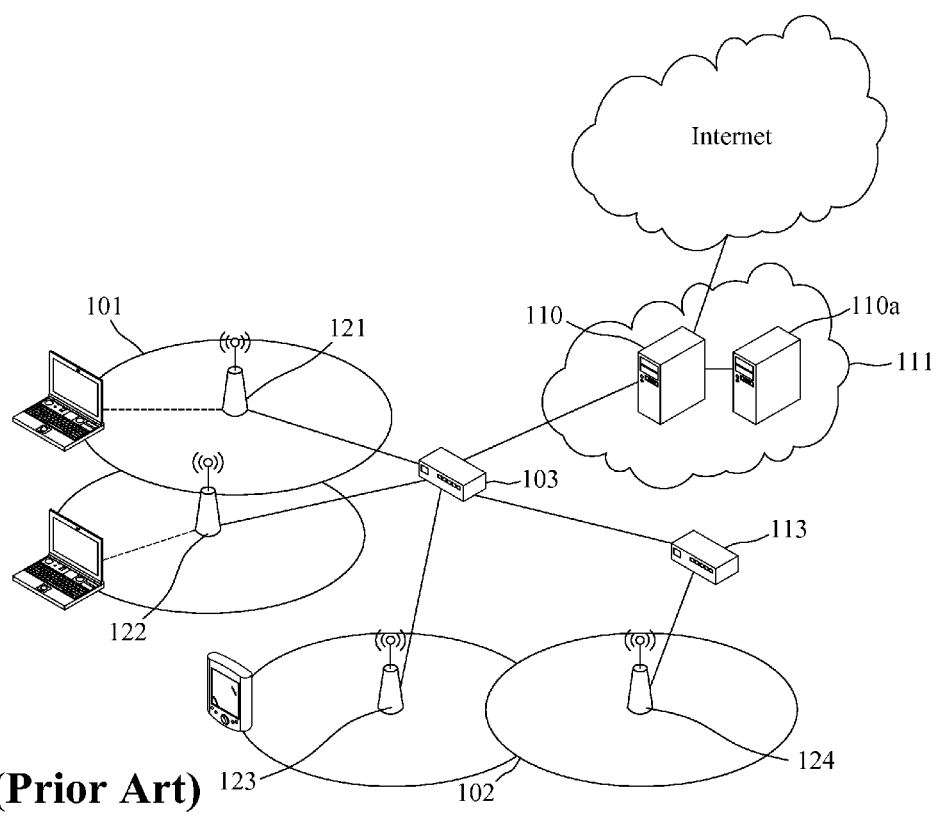
FIG. 1 shows an exemplary schematic view illustrating the architecture of a WiMAX MBS zone.
Figure 2:
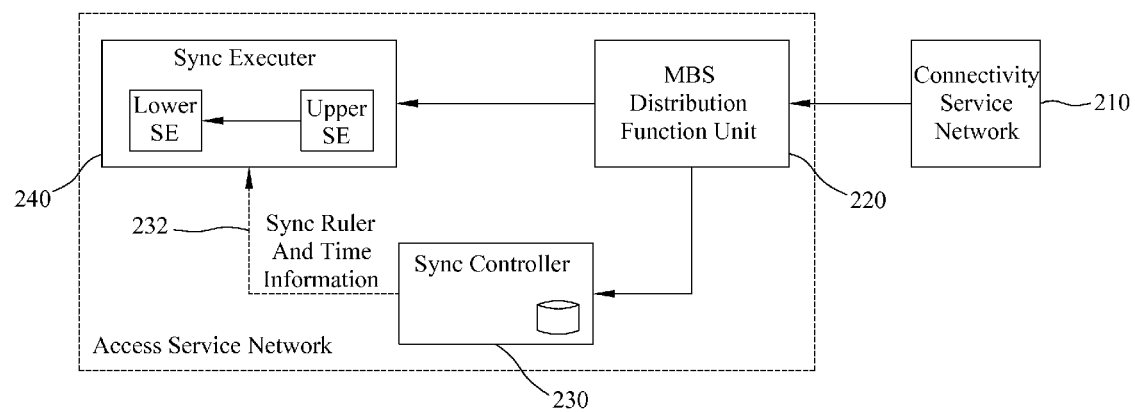
FIG. 2 shows an exemplary schematic view illustrating the architecture of a macro-diversity level synchronization.
Figure 3:
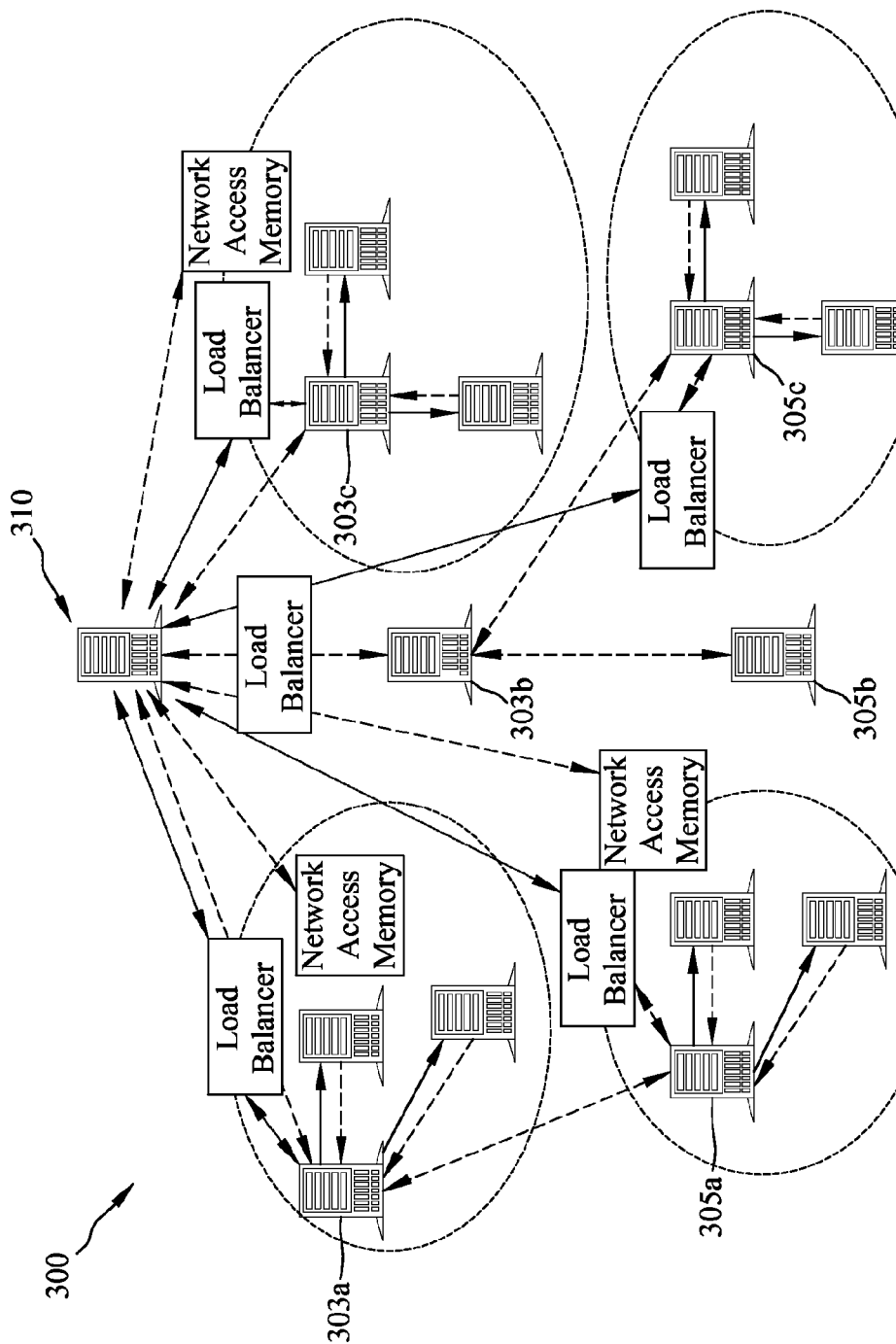
FIG. 3 shows an exemplary schematic view of an information distribution system.
Figure 4:
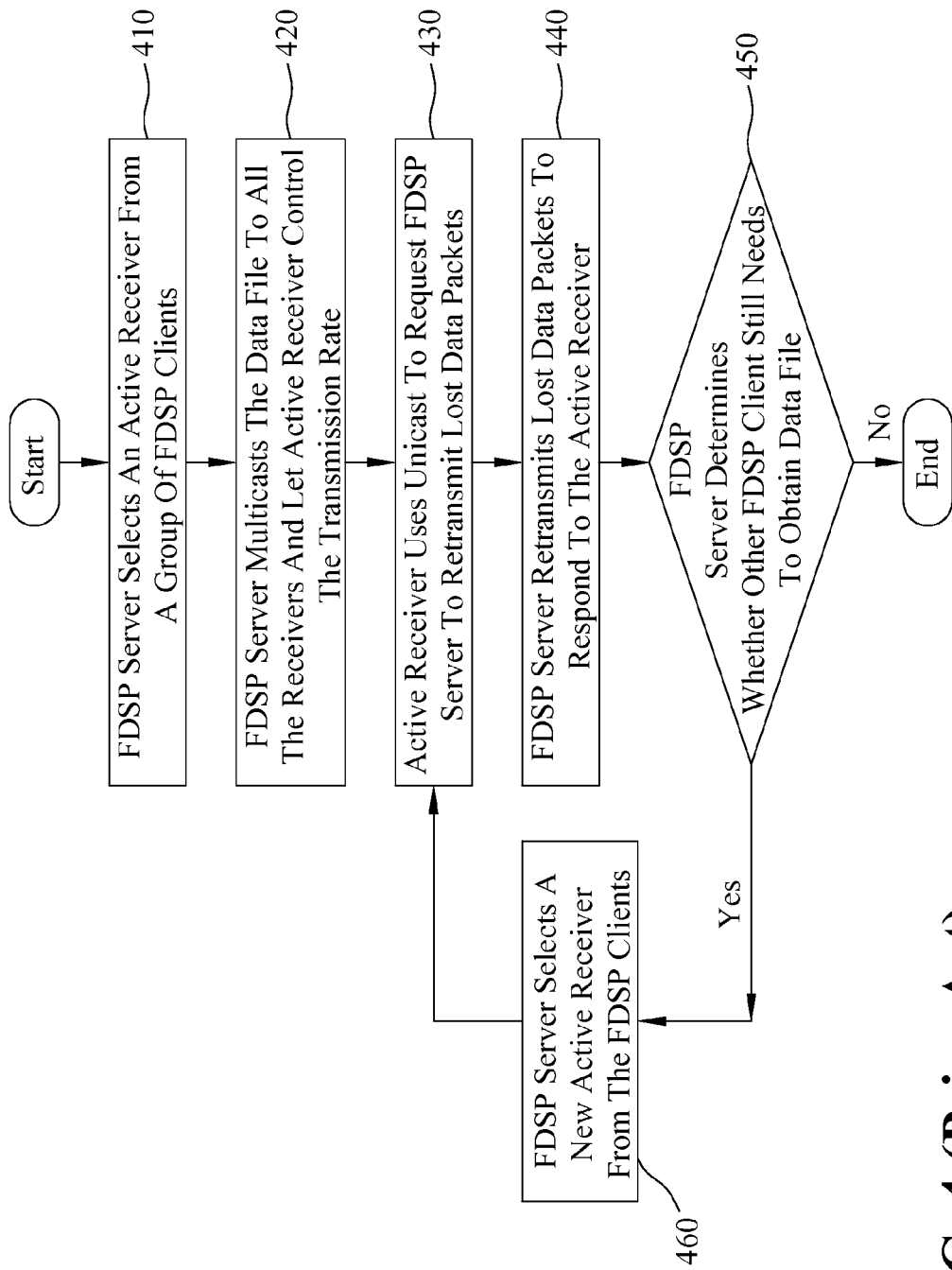
FIG. 4 shows an exemplary flowchart of a method for file distribution and synchronization.
Figure 5:
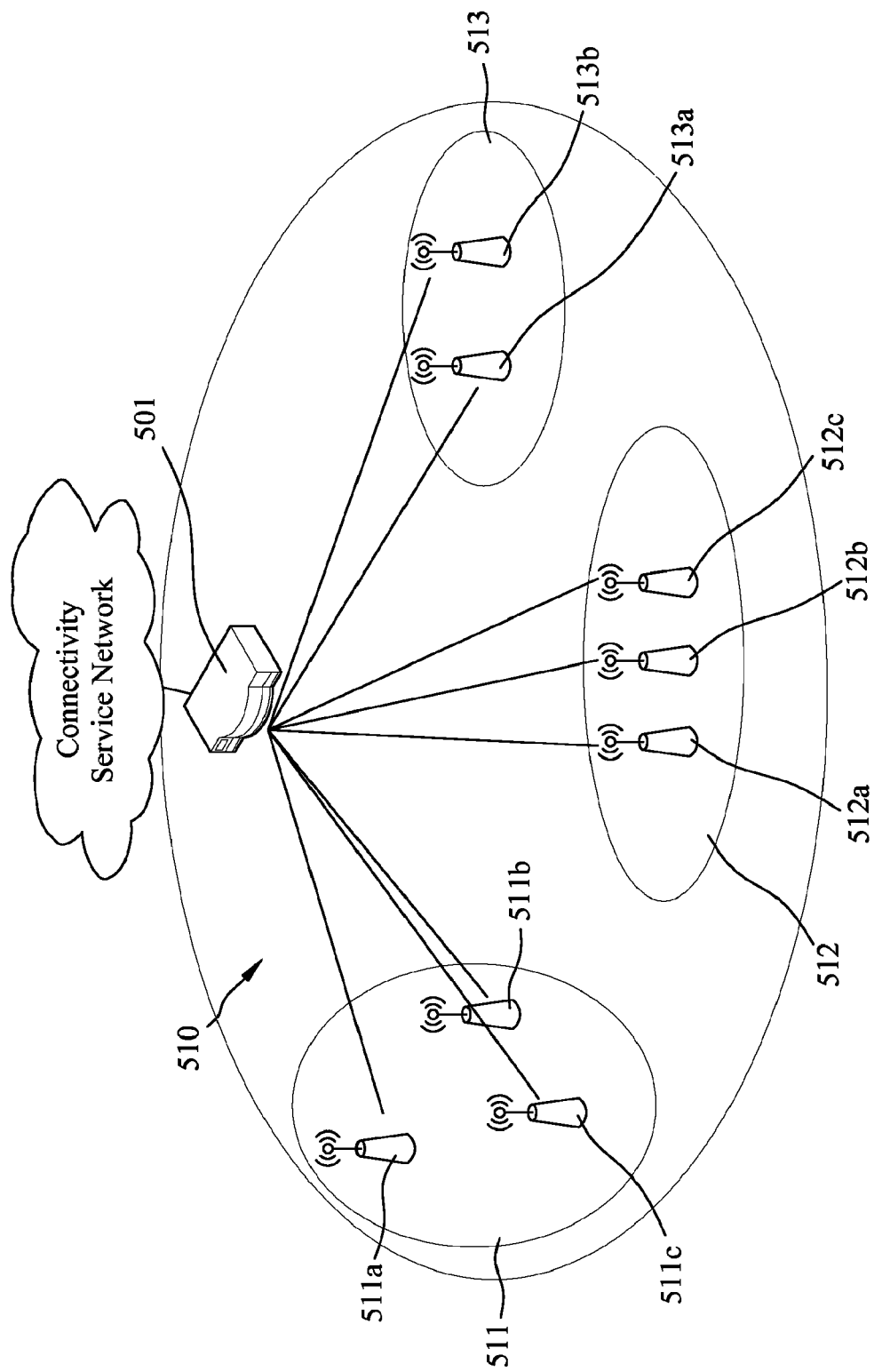
FIG. 5 shows an exemplary schematic view of a reliable synchronization apparatus within a multicast and broadcast service zone in a core network, consistent with certain disclosed embodiments.

FIG. 5 shows an exemplary schematic view of a reliable synchronization apparatus within a MBS zone, consistent with certain disclosed embodiments. Referring to FIG. 5, an MBS zone has m SEs belonging to n retransmission zones, where m>n≧1. For example, MBS zone 510 has 8 SEs, belonging to retransmission zones 511-513. Each retransmission zone may have one or more SEs. For example, retransmission zone 511 has 3 SEs 511a-511c, retransmission zone 512 has 3 SEs 512a-512c, and retransmission zone 513 has 2 SEs 513a-513b.

In MBS zone 510, the reliable synchronization apparatus comprises a sync controller 501 and a plurality of leader SEs, where sync controller 501 pre-selects a leader SE in each retransmission zone of the n retransmission zones. The unselected SEs are the member SEs corresponding to the leader SE. For example, the selected leader SE in retransmission zone 511 is 511a, and SEs 511b, 511c are member SEs. The selected leader SE in retransmission zone 512 is 512b, and SEs 512a, 512c are member SEs. The selected leader SE in retransmission zone 513 is 513b, and SE 513a is member SE.

Sync controller 501 may use multicasting to transmit sync ruler to the leader SE and corresponding member SEs of each retransmission zone. In each retransmission zone, when a sync ruler 501a multicasts to all SEs in the retransmission zone, the leader SE not having received sync ruler 501a unicasts a NACK message to sync controller 501 to request the retransmission of the sync ruler. Sync controller 501 triggers an election to update leader SE information and multicasts the information to all SEs. Each member SE not having received the sync ruler unicats a NACK message to the leader SE or sync controller 501 to request the retransmission of the sync ruler.

Sync controller 501 may multicast through a core network 500 at least a sync ruler to all the SEs in each retransmission zone. For each retransmission zone, sync controller 501 may include a leader priority list to record the priority information of the selected leader SE of the retransmission zone.

Figure 6:
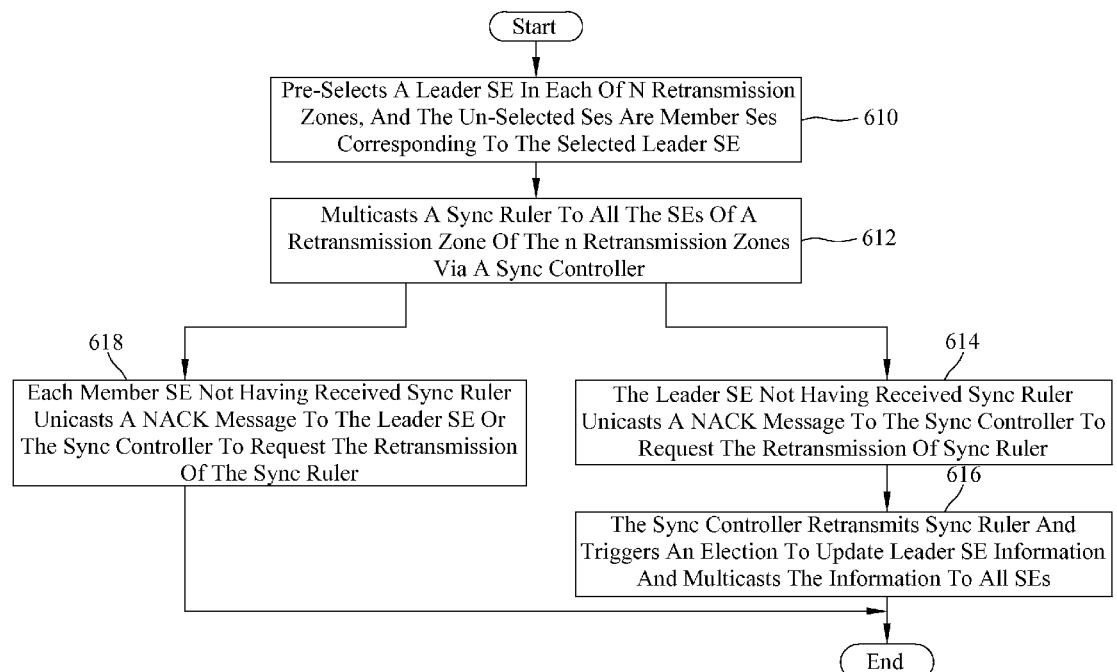
FIG. 6 shows an exemplary schematic view of a reliable synchronization method within a multicast and broadcast service zone, consistent with certain disclosed embodiments.

FIG. 6 shows an exemplary flowchart of a reliable synchronization method within a MBS zone, consistent with certain disclosed embodiments. First, a leader SE is pre-selected in each of n retransmission zones through sync controller 501, and the un-selected SEs are member SEs corresponding to the selected leader SE, as shown in step 610. In step 612, through the sync controller 501, a sync ruler 501a is multicasted to all the SEs of a retransmission zone of the n retransmission zones. In step 614, the leader SE not having received sync ruler 501a unicasts a NACK message to sync controller 501 to request the retransmission of sync ruler. In step 616, sync controller 501 retransmits the sync ruler and triggers an election to update leader SE information and multicasts the information to all SEs. In step 618, each member SE not having received sync ruler 501a unicasts a NACK message to the leader SE or sync controller 501 to request the retransmission of sync ruler 501a.

Because sync controller 501 always keeps the sync ruler in the recovery period of sync ruler 501a, sync controller 501 may check whether the SEs corresponding to the one or more NACK messages are leader SE or member SE before the recovery period of sync ruler 501a, and then multicasts the current leader SE information to each SE to process the retransmission of sync ruler 501a.

The following describes the operations and the interactions of sync controller, leader SE and member SE.

The detailed operation of sync controller 501 includes the following parts. (1) multicasting a sync ruler to all the SEs in each retransmission zone in every other recover period of the sync ruler; (2) keeping the sync ruler in the recovery period of the currently transmitted sync ruler; (3) allocating retransmission zone; and (4) before transmitting the next sync ruler, processing the related retransmission request for received one or more NACK messages.

The allocation of retransmission zone may include the following: (1) in each retransmission zone, setting a leader SE; (2) all the member SEs in this retransmission zone having to know the identity of the leader SE, transmitting the multicast IP of the SE, transmitting the multicast Internet Protocol (IP) of selected leader SE information; and (3) SE being able to differentiate different retransmission zones via different multicast IPs.

Figure 7:
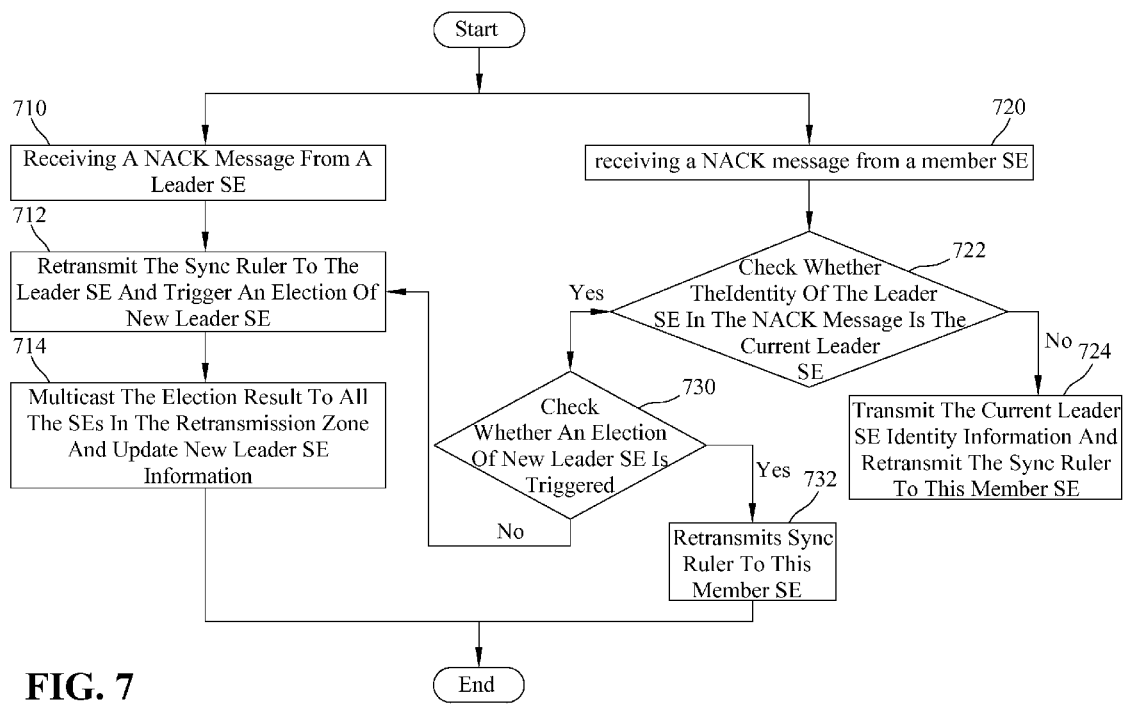
FIG. 7 shows an exemplary flowchart illustrating the sync controller processing a NACK message, consistent with certain disclosed embodiments.

When sync controller 501 receives a NACK message, sync controller 501 first checks whether the NACK message is from the leader SE or from member SE. The related retransmission request is described in combination with FIG. 7. FIG. 7 shows an exemplary flowchart illustrating the sync controller processing a NACK message, consistent with certain disclosed embodiments.

Referring to FIG. 7, when receiving a NACK message from a leader SE (step 710), it means that the leader SE has lost the sync ruler transmitted by the sync controller. Then, the sync controller retransmits the sync ruler to the leader SE and triggers an election of new leader SE (step 712). After the result of the election is known, the sync controller multicasts the election result to all the SEs in the retransmission zone and updates new leader SE information (step 714). In steps 712 and 714, the election of a new leader SE may be conducted according to an election algorithm, such as, centralized scheme or distributed scheme. The centralized scheme and distributed scheme will be described in details later.

If a NACK message is received from a member SE (step 720), the sync controller checks whether the identity of the leader SE in the NACK message is the current leader SE (step 722). If not, sync controller transmits the current leader SE identity information and retransmits sync ruler to this member SE (step 724). If so, the sync controller checks whether an election of new leader SE is triggered (step 730). If the election is triggered (step 732), the sync controller retransmits the sync ruler to this member SE. If the election is not yet triggered, the sync controller executes steps 712 and 714. In the identity information of the current leader SE, a parameter regarding the current leader SE identity is used to point out whether this member SE needs to update the leader SE information according to the current leader SE information.

Figure 8:
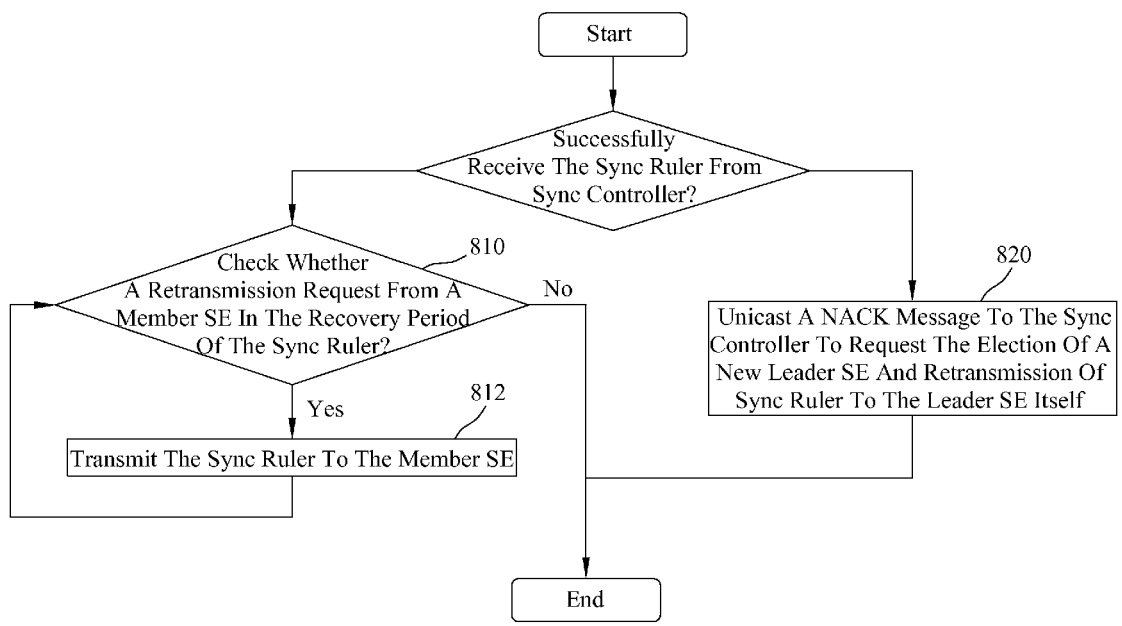
FIG. 8 shows an exemplary flowchart illustrating the operation of a leader SE, consistent with certain disclosed embodiments.

FIG. 8 shows an exemplary flowchart illustrating the operation of a leader SE, mainly on the processing of sync controller receiving process. Referring to FIG. 8, if the leader SE successfully receives the sync ruler from sync controller, the leader SE will process the retransmission requests from its member SEs. The operation includes the checking whether a retransmission request from a member SE in the recovery period of the sync ruler (step 810). If so, the leader SE transmits the sync ruler to the member SE (step 812). This operation is repeated until no further retransmission request is received in the recovery period of the sync ruler.

If the leader SE does not successfully receive the sync ruler from the sync controller, the leader SE unicasts a NACK message to the sync controller to request the election of a new leader SE and retransmission of sync ruler to the leader SE itself (step 820). Then, the sync controller will trigger an election of new leader SE. The election of new leader SE may be conducted according to an election algorithm, as aforementioned.

Member SE processes the receiving of sync ruler differently when the member SE successfully or unsuccessfully receives the sync ruler transmitted by sync controller the first time.

Figure 9:
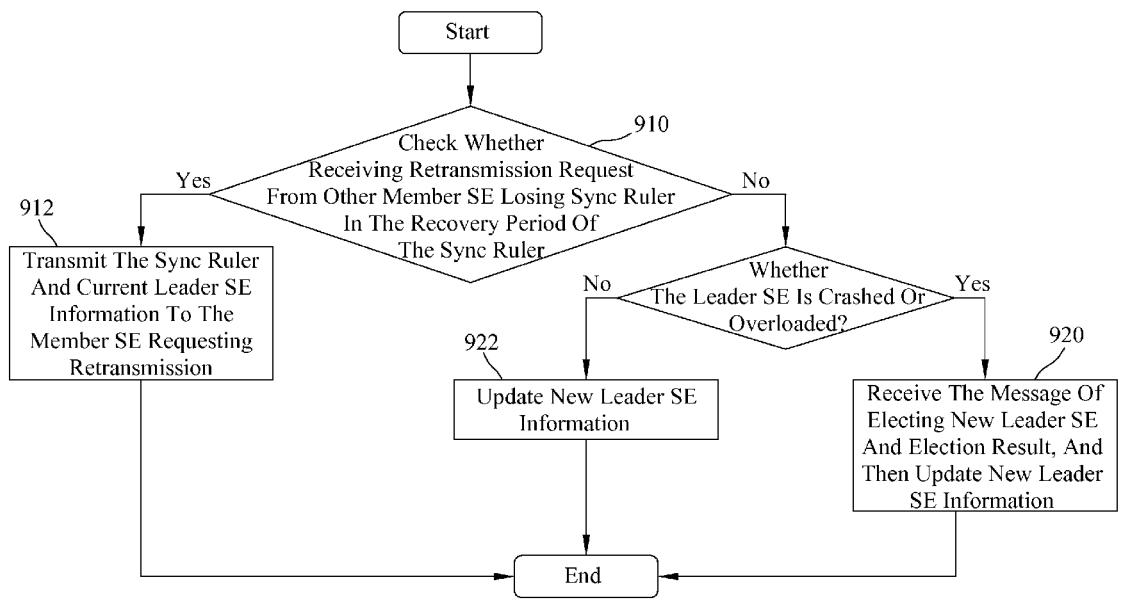
FIG. 9 shows an exemplary flowchart illustrating the operation of a member SE having successfully received the first sync ruler, consistent with certain disclosed embodiments.

FIG. 9 shows an exemplary flowchart illustrating the operation of the member SE successfully receiving the sync ruler transmitted by the sync controller the first time, consistent with certain disclosed embodiments. Referring to FIG. 9, the member SE checks whether it has received retransmission request from other member SE losing the sync ruler in the recovery period of the sync ruler, as shown in step 910. If so, this member SE transmits the sync ruler and current leader SE information to the member SE requesting retransmission, as shown in step 912. If not, if the leader SE is crashed or overloaded, this member SE will receive the message of electing new leader SE and election result, and then update new leader SE information, as shown in step 920. If the leader SE is neither crashed nor overloaded, the new leader SE information is updated, as shown in step 922.

When the member SE does not successfully receive the sync ruler transmitted by the sync controller the first time, the operation includes the following parts: (1) requesting leader SE to retransmit the sync ruler; (2) if the MAX_REQUEST_DELAY_BOUND of the leader SE retransmitting the sync ruler is exceeded, the leader SE is assumed to be crashed or overloaded; (3) requesting the sync controller to retransmit the sync ruler and announce the message of electing new leader SE; and (4) before MAX_REQUEST_DELAY_BOUND expires and election result is already known, requesting the new leader SE to transmit the sync ruler. These operations may be described in the following scenarios.

The first scenario is that member SE receives the sync ruler before MAX_REQUEST_DELAY_BOUND expires[[,]]. The second scenario is that member SE receives the sync ruler retransmitted by the sync controller after MAX_REQUEST_DELAY_BOUND. The third scenario is to receive a NACK message from member SE in the recovery period of the sync ruler. The fourth scenario is that member SE receives the current leader SE information before MAX_REQUEST_DELAY_BOUND expires. The fifth scenario is that member SE receives the current leader SE information after MAX_REQUEST_DELAY_BOUND expires. The sixth scenario is that member SE receives message of electing new leader SE in the recovery period of sync ruler. FIG. 10-FIG. 15 show the exemplary schematic views of the first to the sixth scenarios, consistent with certain disclosed embodiments.

Figure 10:
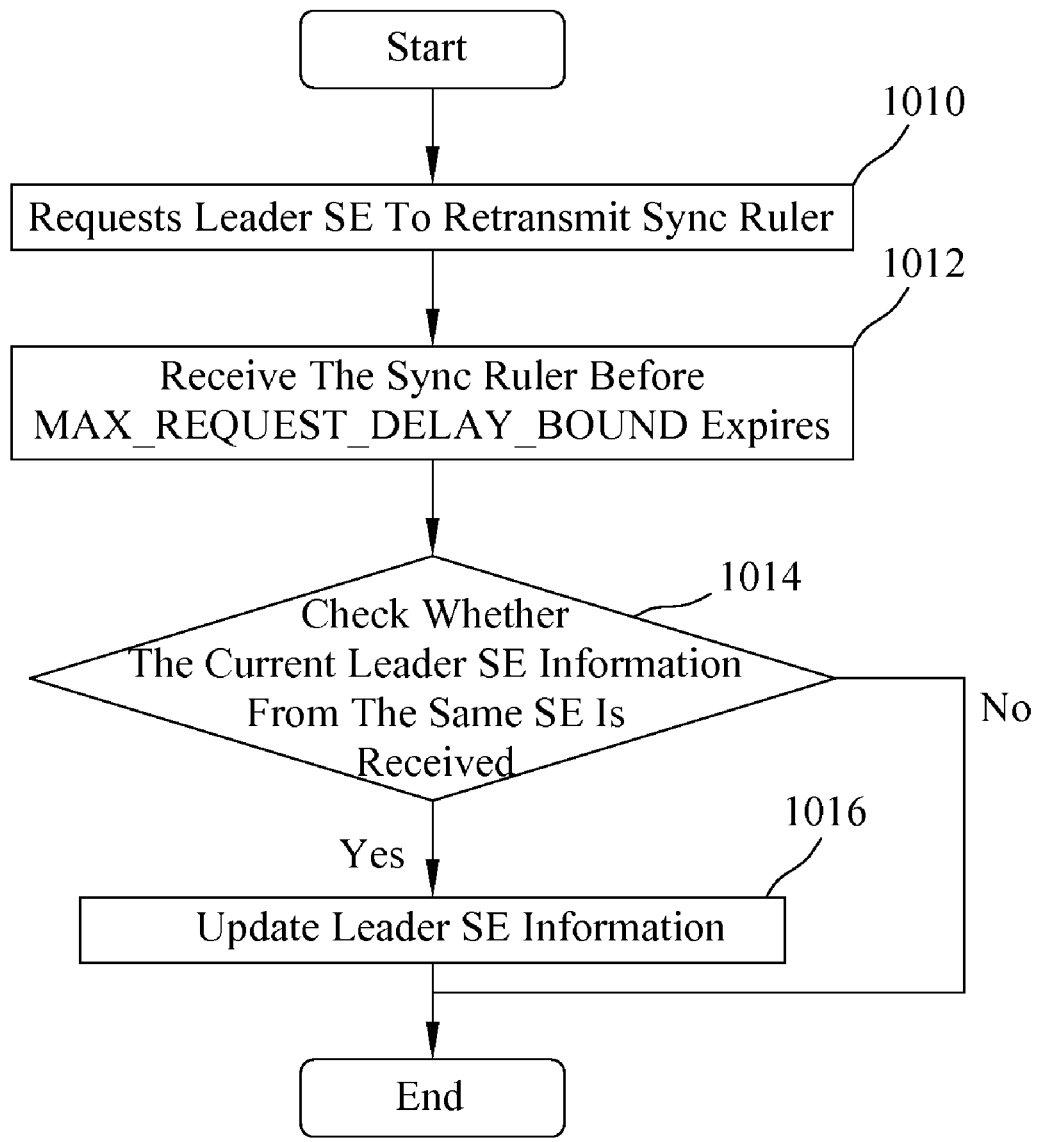
FIG. 10 shows an exemplary flowchart illustrating the operation of member SE not having successfully received the first sync ruler in the first scenario, consistent with certain disclosed embodiments.

In the first scenario of FIG. 10, a member SE has not received the sync ruler after the recovery period of sync ruler, therefore, the member SE requests leader SE to retransmit the sync ruler (step 1010). Then, the member SE receives sync ruler before MAX_REQUEST_DELAY_BOUND expires (step 1012). Step 1014 is to check whether the current leader SE information is received by the member SE. If so, it means that the current leader SE information of the member SE is wrong, and the leader SE information is updated, as shown in step 1016. If not, it means that the current leader SE information of the same SE is correct.

Figure 11:
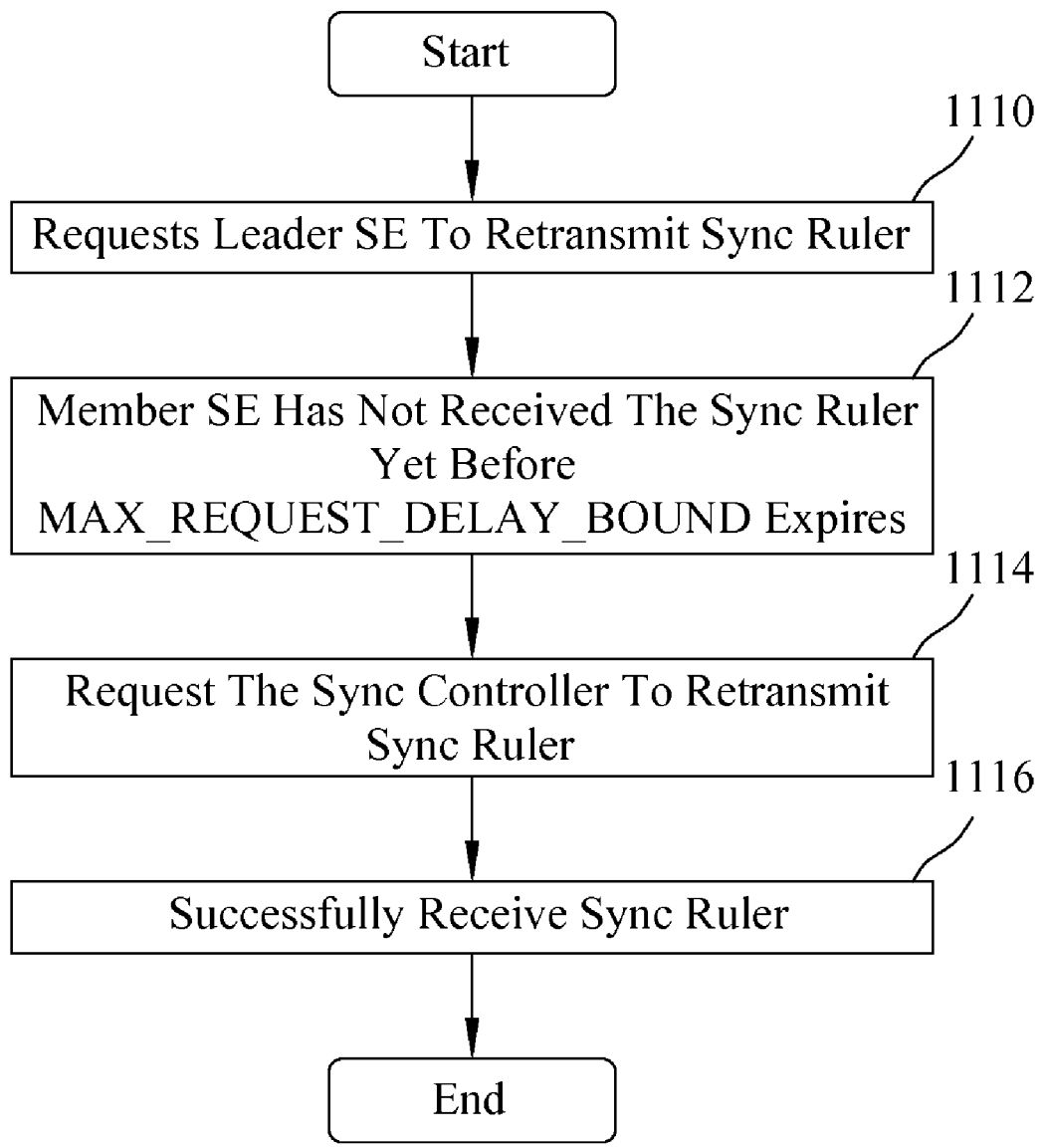
FIG. 11 shows an exemplary flowchart illustrating the operation of a member SE not having successfully received the first sync ruler in the second scenario, consistent with certain disclosed embodiments.

In the second scenario of FIG. 11, member SE has not received the sync ruler after the recovery period of sync ruler, therefore, member SE requests leader SE to retransmit sync ruler (step 1110). Then, member SE has not received the sync ruler yet before MAX_REQUEST_DELAY_BOUND expires (step 1112). Therefore, member SE requests the sync controller to retransmit the sync ruler (step 1114), and member SE successfully receives the sync ruler (step 1116).

Figure 12:
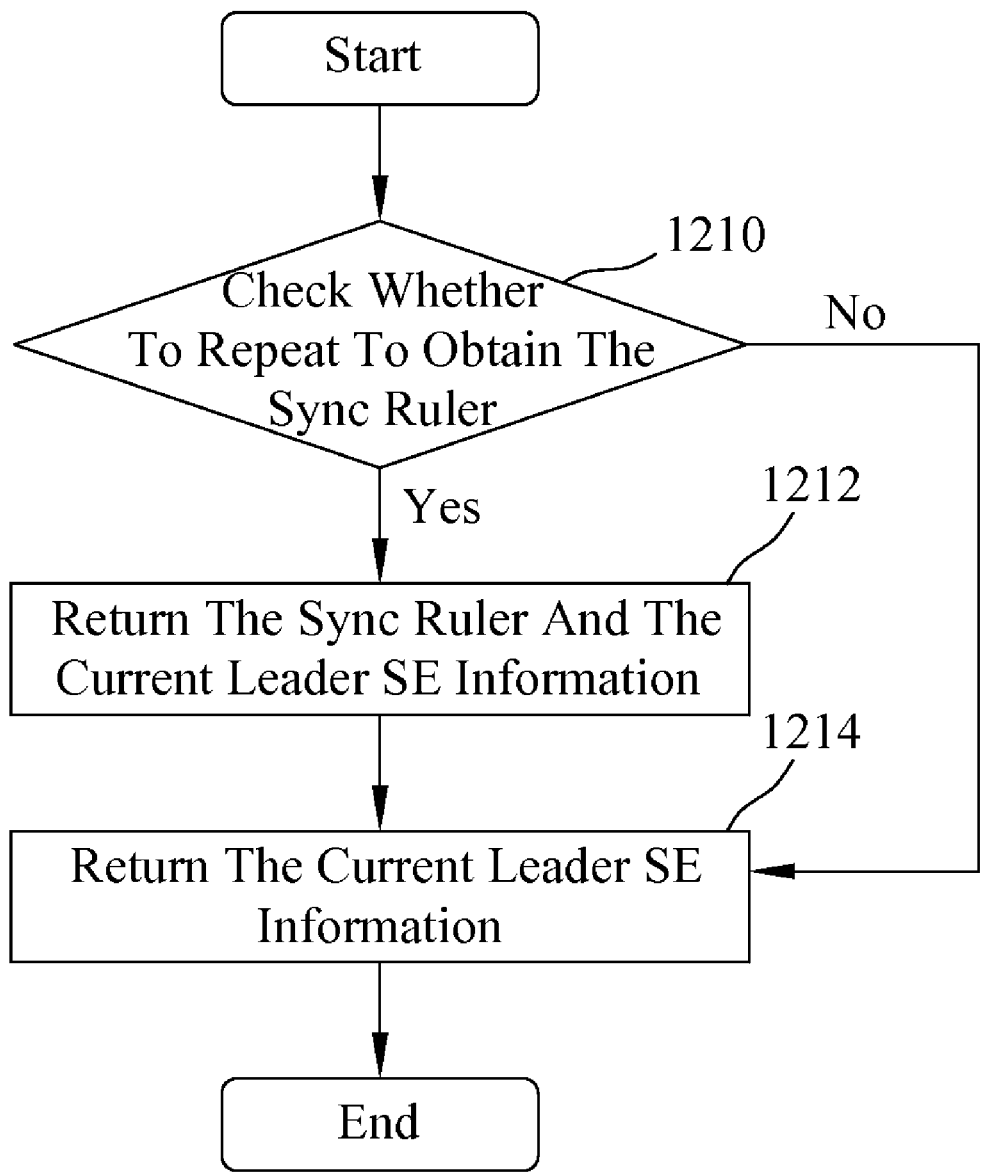
FIG. 12 shows an exemplary flowchart illustrating the operation of a member SE not having successfully received the first sync ruler in the third scenario, consistent with certain disclosed embodiments

In the third scenario of FIG. 12, a first member SE has received a NACK message from a second member SE in the recovery period of the sync ruler. It means that the current leader SE information of this second member SE is wrong. This The first member SE checks whether to repeat to obtain the sync ruler (step 1210). If so, the first member SE returns the sync ruler and the current leader SE information (step 1212). If not, the first member SE returns the current leader SE information (step 1214).

Figure 13:
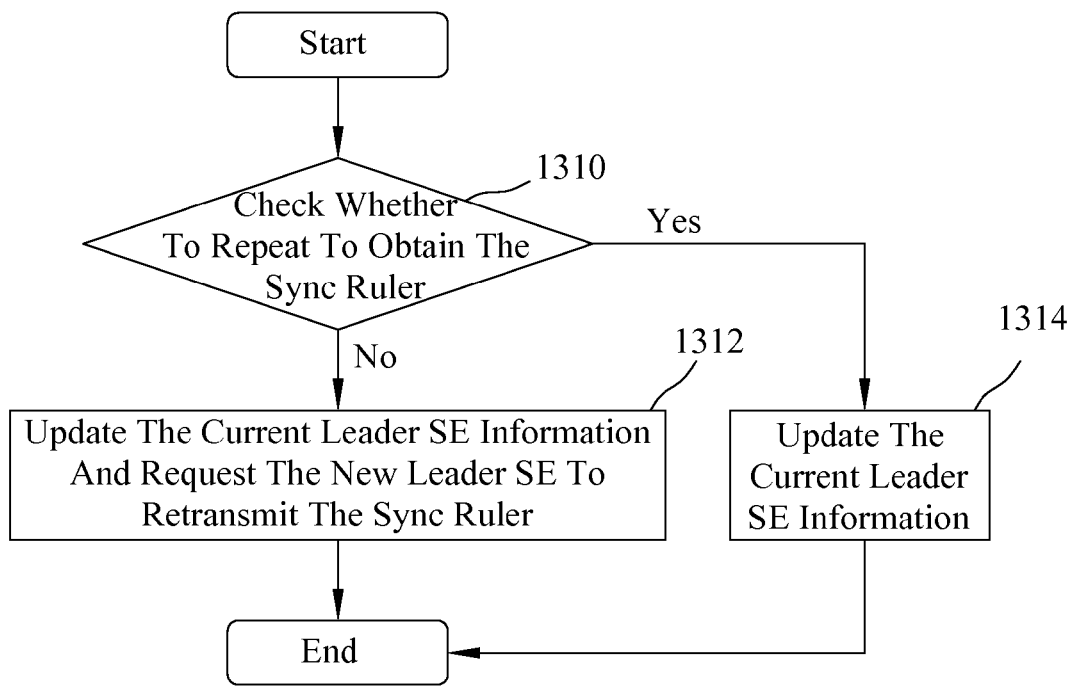
FIG. 13 shows an exemplary flowchart illustrating the operation of a member SE not having successfully received the first sync ruler in the fourth scenario, consistent with certain disclosed embodiments.

In the fourth scenarios of FIG. 13, after member SE receives the current leader SE information, it checks whether to repeat to obtain the sync ruler (step 1310). If the sync ruler is not yet received, the current leader SE information is updated and the member SE requests the new leader SE to retransmit the sync ruler (step 1312). If the sync ruler is received, the current leader SE information is updated (step 1314).

Figure 14:
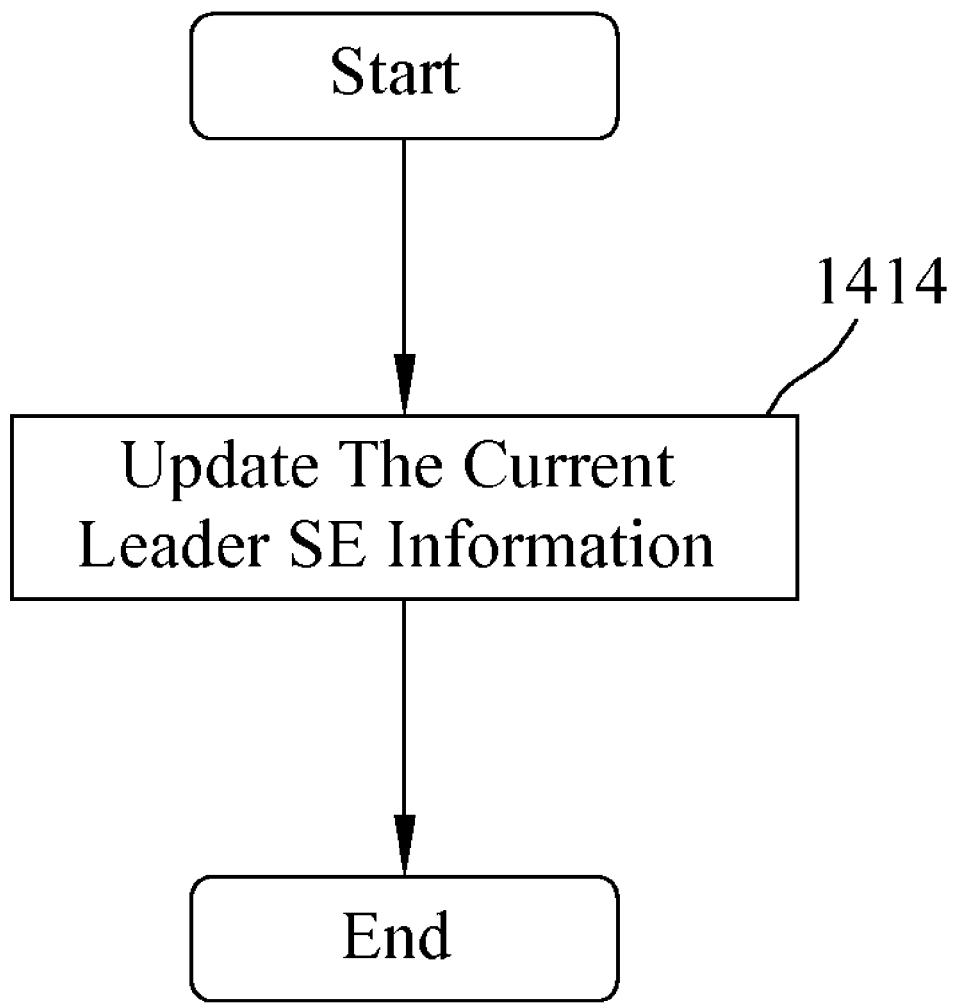
FIG. 14 shows an exemplary flowchart illustrating the operation of a member SE not having successfully received the first sync ruler in the fifth scenario, consistent with certain disclosed embodiments.

In the fifth scenario of FIG. 14, member SE receives the current leader SE information after MAX_REQUEST_DELAY_BOUND expires, and then updates the current leader SE information (step 1414). This is because after MAX_REQUEST_DELAY_BOUND expires, this member SE has already requested sync controller to obtain sync ruler. Therefore, it is only necessary to update the current leader SE information.

Figure 15:
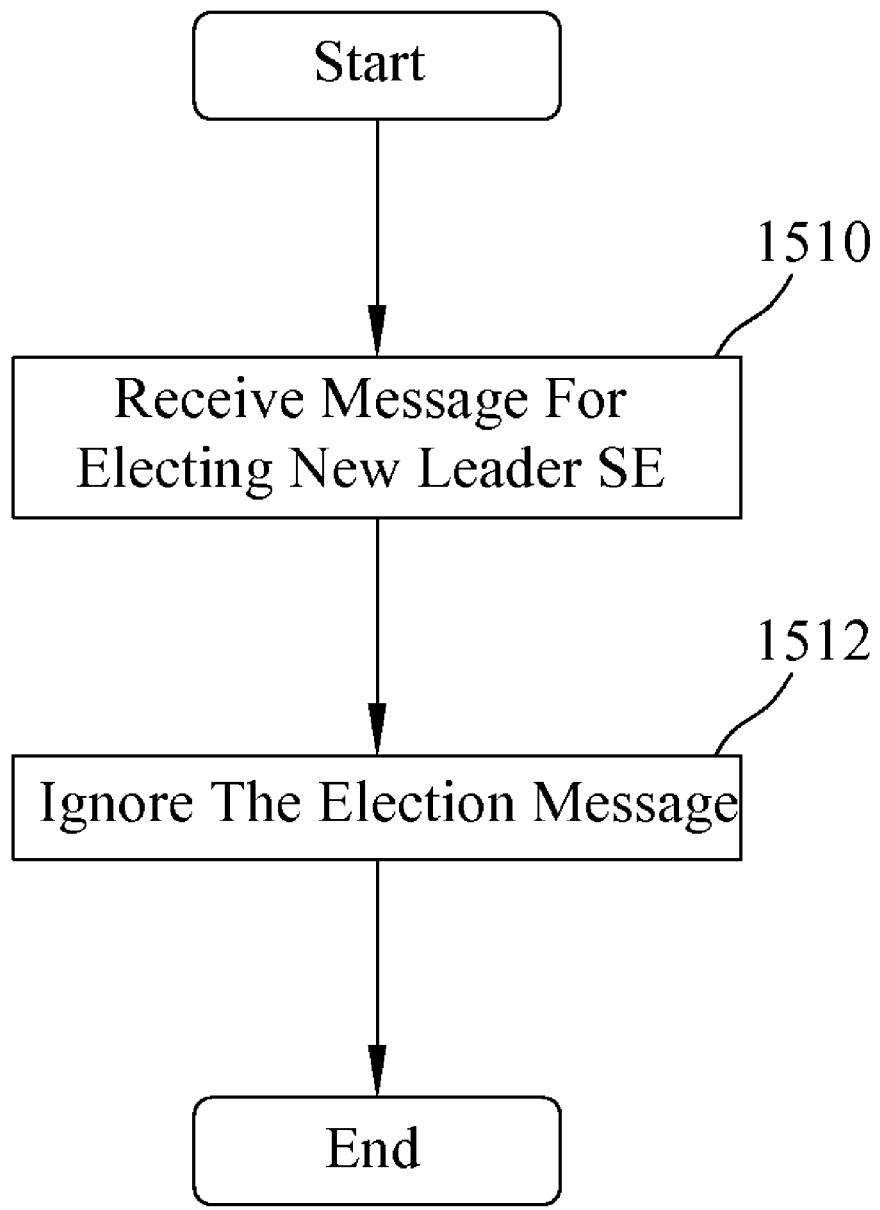
FIG. 15 shows an exemplary flowchart illustrating the operation of a member SE not having successfully received the first sync ruler in the sixth scenario, consistent with certain disclosed embodiments.

In the sixth scenario of FIG. 15, when the member SE not having successfully received the sync ruler transmitted first time has received the message of electing new leader SE (step 1510), this member SE will ignore the election message (step 1512). Because in distributed scheme election algorithm, the identity of the current leader SE in the election message (i.e., the current leader SE information) is zero, and the member SE not having received the sync ruler first time cannot be the candidate for the leader SE. If none of the member SEs is suitable for candidacy of the leader SE, the original leader SE will stay as the leader SE.

Figure 16:
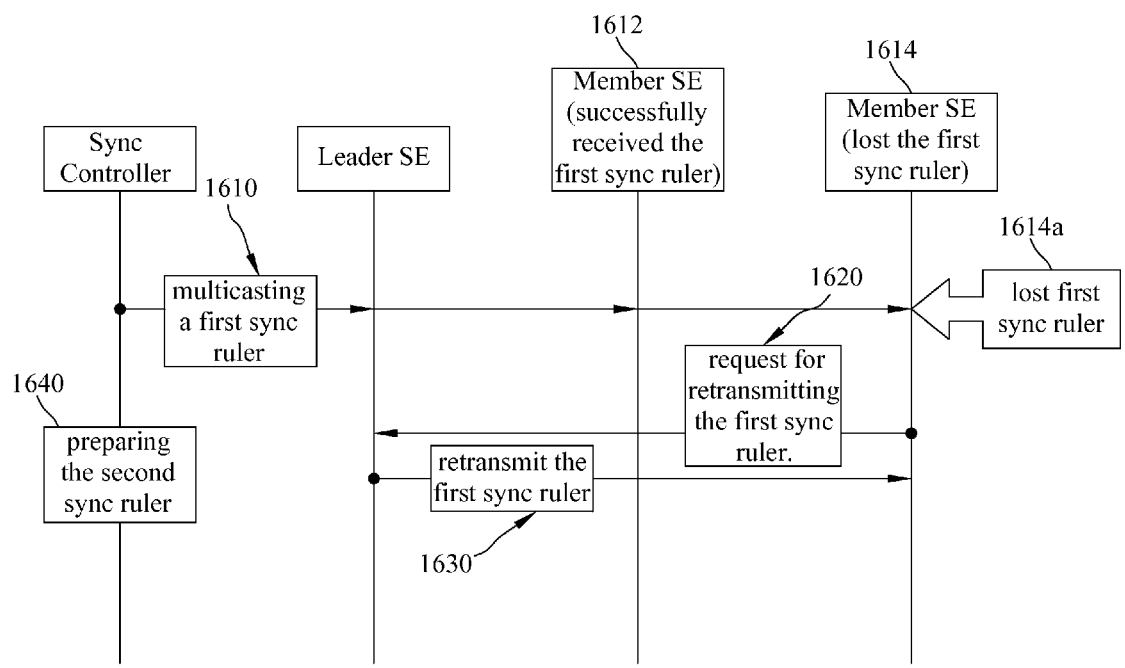
FIG. 16 shows an exemplary schematic view describing the message flow of a leader SE in the first scenario, consistent with certain disclosed embodiments.
Figure 17:
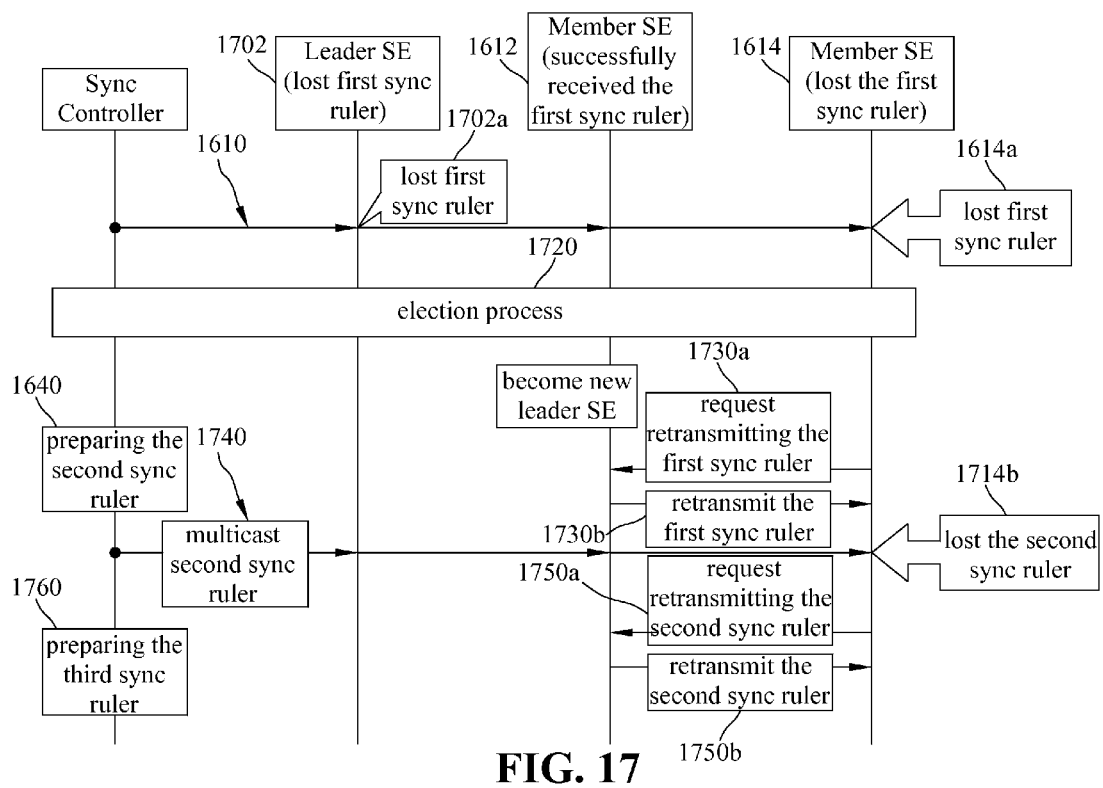
FIG. 17 shows an exemplary schematic view describing the message flow of a leader SE in the second scenario, consistent with certain disclosed embodiments.
Figure 18:
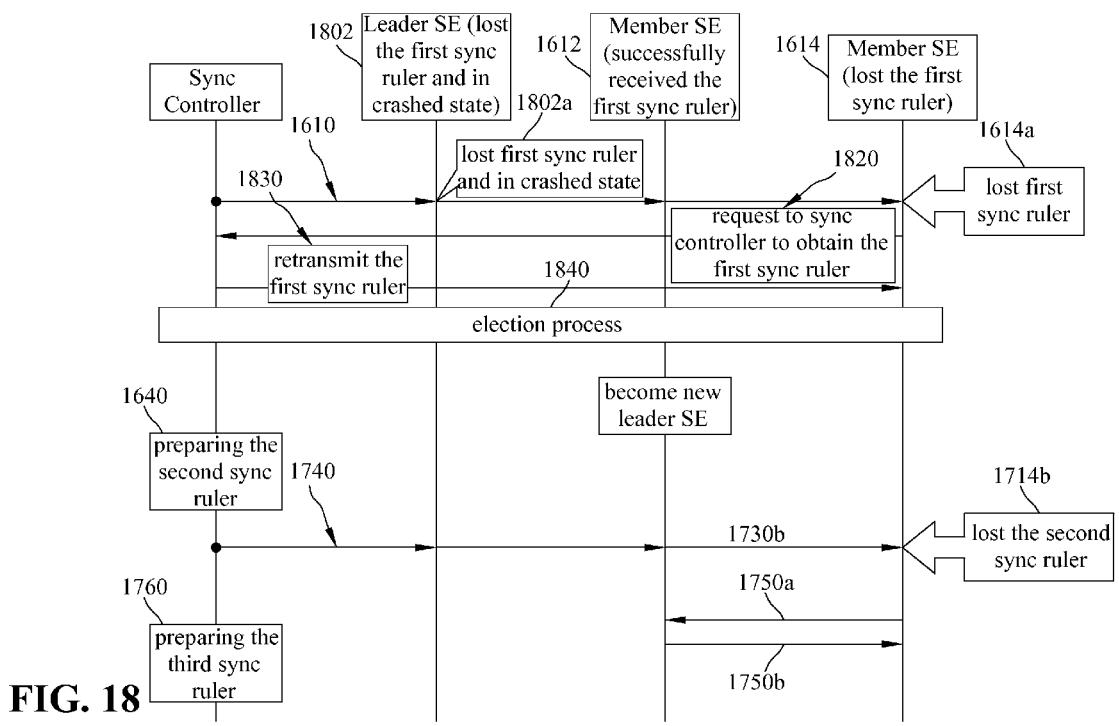
FIG. 18 shows an exemplary schematic view describing the message flow of a leader SE in the third scenario, consistent with certain disclosed embodiments.

When sync controller 501 is in core network 500, sync controller 501 uses multicasting to transmit a sync ruler 501*a* to the leader SE and corresponding member SEs of each retransmission zone, the leader SE may have the following possible scenarios: (1) successfully received the sync ruler; (2) lost the sync ruler; and (3) leader SE being crashed. FIG. 16-FIG. 18 show three schematic views of the above three scenarios, consistent with certain disclosed embodiments.

Referring to the first scenario of FIG. 16, mark 1610 indicates the sync controller multicasting a first sync ruler to the leader SE and corresponding member SEs of each retransmission zone, where member SE 1612 successfully received the first sync ruler, member SE 1614 lost the first sync ruler (as shown in block 1614*a*). Mark 1620 indicates that member SE 1614 requests to leader SE 1601 for retransmitting the first sync ruler. Mark 1630 indicates that leader SE 1602 retransmits the first sync ruler to member SE 1614. Block 1640 indicates that sync controller is preparing the next sync ruler (called the second sync ruler).

Referring to the second scenario of FIG. 17, when the sync controller multicasts the first sync ruler to the leader SE and corresponding member SEs in each retransmission zone, where leader SE 1702 lost the first sync ruler (marked as block 1702*a*), member SE 1612 successfully received the first sync ruler and member SE 1614 lost the first sync ruler. Block 1720 indicates the election process, including leader SE 1702 lost leader right and sends a NACK message to sync controller, and then sync controller triggers an election. After the election is finished, the CURRENT_LEADER_INFO will be announced.

After CURRENT_LEADER_INFO is announced, member SE 1612 becomes the new leader SE. Therefore, member SE 1614 requests to member SE 1612 for retransmitting the first sync ruler, and member SE 1612 retransmits the first sync ruler to member SE 1614, marked as 1730*a* and 1730*b*, respectively. Sync controller prepares the second sync ruler (as shown by 1640), multicasts the second sync ruler to the leader SE and corresponding member SEs of each retransmission zone, marked as 1740. Block 1714*b* indicates member SE 1614 lost the second sync ruler again. Similarly, member SE 1614 requests to member SE 1612 again for retransmitting the second sync ruler, and member SE 1612 retransmits the second sync ruler to member SE 1614, marked as 1750*a* and 1750*b*, respectively. Block 1760 indicates that the sync controller is preparing the next sync ruler (called the third sync ruler).

Referring to the third scenario of FIG. 18, when the sync controller multicasts the first sync ruler to the leader SE and corresponding member SEs in each retransmission zone, where leader SE 1802 lost the first sync ruler and is in the crashed state (marked as block 1802*a*), member SE 1612 successfully received the first sync ruler and member SE 1614 lost the first sync ruler. When member SE 1614 has not yet received the first sync ruler before the MAX_REQUEST_DELAY_BOUND expires, member SE 1614 requests sync controller for obtaining the first sync ruler, marked as 1820. The sync controller retransmits the first sync ruler to member SE 1614, marked as 1830.

After that, block 1840 indicates the election process. Because leader SE 1802 is in the crashed state, election process 1840 includes sync controller triggering election. After election process, the new leader SE information is announced. After the new leader SE information is announced, the subsequent message flow is the same as in FIG. 17, thus is omitted here.

The following describes the centralized and distributed election algorithms, and how the centralized or distributed election algorithm is executed in leader SE having lost sync ruler or leader SE in crashed state.

When using centralized election algorithm, for each retransmission zone, the sync controller may include a leader priority list to record the priority information of the selection of leader SE in this retransmission zone. The sync controller needs to consider some parameters to set the leader priority list. Once the leader SE loses the sync ruler, the sync controller triggers an election. Then, based on the leader priority list, a new leader SE is assigned and current leader information is multicast to all the SEs in this retransmission zone. The current leader SE information includes the information of the new leader SE.

If centralized election algorithm is used in the scenarios of leader SE losing sync ruler in FIG. 17, after leader SE 1702 having lost sync ruler sends a NACK message to the sync controller, the sync controller assigns member SE 1612 as the new leader SE according to the pleader priority list, and multicasts the current leader SE information to all the SEs in this retransmission zone.

If centralized election algorithm is used in the scenarios of leader SE in crashed state in FIG. 18, when member SE 1614 has not received the first sync ruler before MAX_REQUEST_DELAY_BOUND expires, member SE 1614 requests to the sync controller to obtain the first sync ruler. The sync controller retransmits the first sync ruler to member SE 1614, and then based on the leader priority list, assigns member SE 1612 as the new leader SE and multicasts the current leader SE information to all the SEs in this retransmission zone.

When using distributed election algorithm, in a fair opportunity, any member SE may be the leader SE. When sync controller triggers election, the election message (in the election message, the current leader SE information is set as zero) is multicast to all the SEs in the retransmission zone. After receiving the election message, the SEs successfully receive the sync ruler in the current time interval may be candidates for the leader SE. When the current time interval expires, the leader SE candidates will unicast the current leader SE information (including the identity of the leader SE candidate) to the sync controller. The first identity of leader SE candidate received by sync controller is assigned as the new leader SE, and the current leader SE information will be multicast to all the SEs in the retransmission zone.

If distributed election algorithm is used in the scenarios of leader SE losing sync ruler in FIG. 17, after leader SE 1702 having lost the sync ruler sends a NACK message to the sync controller, the sync controller multicasts an election message (in the election message, current leader SE information is set as zero) to all the SEs in the retransmission zone. After member SE 1612 receives the election message, member SE 1612 sets its timer. When the timer is up, the member SE unicasts the current leader SE information (including identity of member SE 1612) to the sync controller. The first identity of member SE 1612 received by the sync controller is assigned as the new leader SE and the election result (i.e., the current leader SE information, including identity of member SE 1612) is multicast to all the SEs in this retransmission zone.

If distributed election algorithm is used in the scenarios of leader SE in crashed state in FIG. 18, when member SE 1614 requests to the sync controller to obtain the first sync ruler, the sync controller retransmits the first sync ruler to member SE 1614, and then multicasts an election message (in the election message, current leader SE information is set as zero) to all the SEs in the retransmission zone. After the member SE 1612 receives the election message, all the steps up to the step when the sync controller multicasting the election result to all the SEs in the retransmission zone are the same as those in above FIG. 17 using the distributed election algorithm, thus the description is omitted here.

In summary, the disclosed exemplary embodiments may provide a reliable synchronization apparatus and method within a multicast and broadcast service zone. Based on multicasting, the exemplary embodiments divide a MBS zone into a plurality of retransmission zones, and assign a leader SE in each retransmission zone according to an election algorithm to replace the sync controller to execute the retransmission process. The leader SE not having received the sync ruler unicasts a NACK message to the sync controller, then the sync controller triggers an election to elect a new leader SE. The member SEs not having received sync ruler unicast NACK messages to the leader SE or the sync controller to request the current leader SE or the sync controller to retransmit the sync ruler. The exemplary embodiments improve the retransmission effectiveness and assure the retransmission reliability.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A reliable synchronization apparatus within a multicast and broadcast service (MBS) zone, said MBS zone having m sync executers (SEs) and said m SEs belonging to n retransmission zones respectively, m>n≧1, each retransmission zone having a selected leader SE and un-selected SEs being member SEs of the selected leader SE, said apparatus comprising:
   n selected leader SEs; and
   a sync controller, wherein in each retransmission zone, when said sync controller multicasts a sync ruler to all SEs in said retransmission zone, the leader SE not having received said sync ruler unicasts a NACK message to said sync controller to request retransmitting said sync ruler, said sync controller retransmits said sync ruler and triggers an election of a new leader SE to update leader SE information and multicasts new leader SE information to all SEs in said retransmission zone, and each member SE not having received said sync ruler unicasts a NACK message to the leader SE of said retransmission zone or said sync controller to request retransmitting said sync ruler.

2. The apparatus as claimed in claim 1, wherein for each retransmission zone of said n retransmission zones, said sync controller further includes a leader priority list to record priority information of selecting the leader SE in said retransmission zone.

3. The apparatus as claimed in claim 1, wherein said sync controller multicasts through a core network a sync ruler in every other recovery period of sync ruler to all SEs of said retransmission zone.

4. The apparatus as claimed in claim 3, wherein said core network is a wireless network.

5. The apparatus as claimed in claim 1, wherein after said election generates an election result, said sync controller multicasts said election result to all SEs of said retransmission zone and updates leader SE information.

6. The apparatus as claimed in claim 3, wherein said sync controller keeps said sync ruler during said recovery period of said sync ruler.

7. The apparatus as claimed in claim 1, wherein each member SE further includes a timer and sets said timer when receiving an election message multicast by said sync controller, and when said timer expires, said member SE unicasts current leader SE information to said sync controller.

8. The apparatus as claimed in claim 1, wherein if said member SE not having received said sync ruler has not received said sync ruler after a recovery period of said sync ruler expires, the member SE requests said leader SE to retransmit said sync ruler.

9. The apparatus as claimed in claim 1, wherein if said member SE not having received said sync ruler has not received said sync ruler after a recovery period of said sync ruler expires and before a MAX_REQUEST_DELAY_BOUND expires, the member SE requests said leader SE to retransmit said sync ruler.

10. The apparatus as claimed in claim 1, wherein said sync controller generates an election result containing the new leader SE information according to an election algorithm.

11. A reliable synchronization method within a multicast and broadcast service (MBS) zone, said MBS zone having m sync executers (SEs) and said m SEs belonging to n retransmission zones respectively, $m>n\geq 1$, said method comprising:

pre-selecting a leader SE in each retransmission zone of said n retransmission zones, un-selected SEs in said retransmission zone being corresponding member SEs of said leader SE;

through a sync controller, multicasting a sync ruler to all SEs of each retransmission zone of said n retransmission zones;

unicasting a NACK message from the leader SE not having received said sync ruler to said sync controller to request retransmitting said sync ruler, said sync controller retransmitting said sync ruler and triggering an election of a new leader SE to update leader SE information and multicasting new leader SE information to all SEs in said retransmission zone; and unicasting a NACK message from each of member SEs not having received said sync ruler to the leader SE of said retransmission zone or said sync controller to request retransmitting said sync ruler.

12. The method as claimed in claim 11, wherein said sync controller generates an election result containing the new leader SE information according to one of either distributed or centralized election algorithm.

13. The method as claimed in claim 11, wherein if said leader SE of said retransmission zone has successfully received said sync ruler multicast by said sync controller, said leader SE further executes:

checking whether a retransmission request is received from a member SE in a recovery period of said sync ruler; and if so, transmitting said sync ruler to said member SE;

repeating said operation until no further retransmission request is received in said recovery period of said sync ruler.

14. The method as claimed in claim 11, wherein if a member SE of said retransmission zone has successfully received said sync ruler multicast by said sync controller, said member SE further executes:

checking whether a retransmission request is received from other member SEs having lost said sync ruler in a recovery period of said sync ruler; and if so, said member SE transmitting said sync ruler and current leader SE information to the member SE requesting retransmission; and updating the leader SE information.

15. The method as claimed in claim 14, wherein if no retransmission request from other member SEs having lost said sync ruler is received, and if the leader SE of said retransmission zone is crashed or overloaded, said member SE receives a message of electing a new leader SE and an election result, and then updates the leader SE information.

16. The method as claimed in claim 11, wherein among all of said member SEs not having received said sync ruler, if a member SE has received said sync ruler after a recovery period of said sync ruler expires and before a MAX_REQUEST_DELAY_BOUND expires, said member SE further executes:

requesting its leader SE to retransmit said sync ruler after said recovery period of said sync ruler expires;

before said MAX_REQUEST_DELAY_BOUND expires, receiving said sync ruler; and checking whether current leader SE information is received, and updating leader SE information if said current leader SE information is received.

17. The method as claimed in claim 11, wherein among all of said member SEs not having received said sync ruler, if a member SE has received said sync ruler after a MAX_REQUEST_DELAY_BOUND expires, said member SE further executes:

requesting its leader SE to retransmit said sync ruler;

requesting said sync controller to retransmit sync ruler after said MAX_REQUEST_DELAY_BOUND expires; and receiving said sync ruler.

18. The method as claimed in claim 11, wherein among all of said member SEs not having received said sync ruler, if a first member SE receives a NACK message from a second member SE, said first member SE further executes:

checking whether to repeat obtaining said sync ruler; and if so, returning said sync ruler and current leader SE information; otherwise, returning current leader SE information.

19. The method as claimed in claim 11, wherein among all of said member SEs not having received said sync ruler, if a member SE has received current leader SE information before a MAX_REQUEST_DELAY_BOUND expires, said member SE further executes:

checking whether to repeat obtaining said sync ruler; and updating current leader SE information and requesting a new leader SE in the current leader SE information to retransmit said sync ruler if said sync ruler has not been received; otherwise, updating current leader SE information.

20. The method as claimed in claim 11, wherein among all of said member SEs not having received said sync ruler, if a member SE has received current leader SE information after a MAX_REQUEST_DELAY_BOUND expires, said member SE updates current leader SE information.

21. The method as claimed in claim 11, wherein among all of said member SEs not having received said sync ruler, if a member SE has received a message of electing a new leader SE during a recovery period of said sync ruler, said member SE ignores said message.

22. The method as claimed in claim 11, wherein in the condition of a leader SE successfully receiving said sync ruler, each member SE of said leader SE not having received said sync ruler requests to said leader SE for retransmitting said sync ruler, and said leader SE retransmits said sync ruler to the member SE requesting retransmission.

23. The method as claimed in claim 11, wherein in the condition of a leader SE having lost said sync ruler, said leader SE loses leadership and unicasts said NACK message to said sync controller, and then said election is triggered and said sync controller generates and announces new leader SE information according to an election algorithm.

24. The method as claimed in claim 11, wherein in the condition of a leader SE having lost said sync ruler and in a crashed state, if a member SE has not received said sync ruler before a MAX_REQUEST_DELAY_BOUND expires, said member SE requests said sync controller for retransmitting said sync ruler, and said sync controller further executes:

retransmitting said sync ruler to said member SE; and performing an election process of a new leader SE, and announcing new leader SE information.

25. The method as claimed in claim 12, wherein when said sync ruler uses said distributed election algorithm, each member SE in said retransmission zone has a fair opportunity to become the leader SE of said retransmission zone.

26. The method as claimed in claim 12, wherein when said sync ruler uses said centralized election algorithm, a leader priority list is used in generating a new leader SE.

* * * * *